US007216663B2

(12) United States Patent
Vu (10) Patent No.: US 7,216,663 B2
(45) Date of Patent: May 15, 2007

(54) DIVERTING DEVICE FOR BRIDGE FAUCET WITH HAND SPRAY

(75) Inventor: Vinh Vu, Lawndale, CA (US)

(73) Assignee: Brasstech Inc., Santa Ana, CA (US)

( * ) Notice: Subject to any disclaimer, the term of this patent is extended or adjusted under 35 U.S.C. 154(b) by 274 days.

(21) Appl. No.: 10/958,914

(22) Filed: Oct. 5, 2004

(65) Prior Publication Data

US 2006/0070668 A1    Apr. 6, 2006

(51) Int. Cl.
*E03C 1/02* (2006.01)
(52) U.S. Cl. .................. 137/119.04; 137/597
(58) Field of Classification Search ........... 137/119.04, 137/597, 606
See application file for complete search history.

(56) References Cited

U.S. PATENT DOCUMENTS 1,181,370 A * 5/1916 Brown ........................ 137/606
2,314,071 A * 3/1943 Bucknell et al. ........ 137/119.04
4,429,422 A    2/1984 Wareham
5,232,008 A    8/1993 Jeffress et al.
5,778,921 A    7/1998 Ko
5,881,754 A * 3/1999 Wei ......................... 137/119.04
6,062,249 A    5/2000 Givler
6,341,617 B1   1/2002 Wilson
6,363,961 B1 * 4/2002 Wang ...................... 137/119.05
6,561,210 B2   5/2003 Hsieh et al.
2004/0123910 A1 7/2004 Yardley

* cited by examiner

*Primary Examiner*—Stephen M. Hepperle
(74) *Attorney, Agent, or Firm*—Carlson, Gaskey & Olds (57) ABSTRACT

A faucet assembly includes a diverter valve assembly mounted to an inlet of a cold-water pillar and is in fluid communication with a control valve disposed on a hot-water pillar. The diverter valve assembly selectively controls water flow through a spout and a hand spray. The faucet assembly includes a cold-water pillar and a hot-water pillar that are pivotally connected to a bridge that allows adjustment of a distance between the hot and cold-water pillars.

18 Claims, 6 Drawing Sheets

*Fig-8*

DIVERTING DEVICE FOR BRIDGE FAUCET WITH HAND SPRAY

BACKGROUND OF THE INVENTION

This invention relates generally to a faucet including a hand spray, and more particularly to a bridge faucet including a diverter valve for selectively diverting water between a faucet spout and the hand spray.

Conventional faucet assemblies include a hot-water control valve and a cold-water control valve for regulating water flow into a mixing chamber. From the mixing chamber water flows out of a spout. Many faucet assemblies include a diverter valve for diverting water from the spout to a hand spray. The diverter valve actuates in response to water flow through the hand spray and is typically disposed within the mixing chamber downstream of fluid control valves. The location of the diverter valve within the mixing chamber provides for mixing of water before entering the diverter valve. In many applications a hose in communication with the mixing chamber provides the fluid conduit to the hand spray. In many cases, the hose is in communication through an opening in the mounting surface such that the hand spray may be nested in another opening near the sink.

Disadvantageously, in some faucet configurations it is not practical to install a diverter valve in a mixing chamber. One such example faucet configuration is known in the art as a bridge faucet. A bridge faucet typically includes a hot-water pillar and a cold water pillar that extend upward and above the mounting surface. The hot-water and cold-water pillars include a control valve for controlling fluid flow into a bridge portion. The bridge portion defines a mixing chamber having an outlet to a spout. Water from each of the pillars travels upward and into the bridge portion for mixing. A hand spray is not typically included for a bridge faucet because it is typically not aesthetically desirable to connect a hose to a bridge portion.

One example bridge faucet that addresses this problem includes a diverter valve assembly below the mounting surface. A central block includes a diverter valve and is in fluid communication with the hot and cold-water inlets as well as the hand spray. Incoming water flow is controlled by a control valve disposed below the mounting surface and controlled by handle at the top of the water pillars. Incoming water from each of the hot and cold-water inlets is first flowed to the centrally located diverter valve assembly, and then back to the pillars to flow up to the mixing chamber. Actuation of the hand spray causes the diverter valve to close off flow up the pillars and directs flow out the hand spray. Disadvantageously, the prior art faucet assembly is cumbersome and cannot accommodate installation with a varying distance between hot and cold-water pillars. Further, there are many connections providing additional possibilities for fitting leakage.

Accordingly, it is desirable to develop a bridge faucet assembly that includes a diverter valve and hand spray that reduces the number of water connections and adapts to various hole spacing.

SUMMARY OF THE INVENTION

An example faucet assembly includes a diverter valve assembly mounted to an inlet of a cold-water pillar in fluid communication with a control valve disposed on a hot-water pillar. The diverter valve assembly selectively controls water flow through a spout and a hand spray.

The faucet assembly includes a cold-water pillar and a hot-water pillar. A bridge across the cold-water pillar and the hot-water pillar includes a spout for dispensing water. The bridge includes pivotal connections that allow for the adjustment of a distance between the hot and cold-water pillars. The cold-water pillar includes a diverter valve assembly. The hot-water pillar includes a control valve assembly that houses a valve cartridge for proportionally controlling water flow from the inlet. A flexible connector hose communicates water from the control valve assembly to the diverter valve assembly.

A hand spray is in fluid communication with the diverter assembly through a flexible hose. Water normally flows upward through the cold-water pillar into the bridge and out the spout. Actuation of the hand spray causes a diverter valve to actuate and divert water flow to the hand spray.

Accordingly, the example faucet assembly provides for the use of a hand spray with a bridge type faucet. The diverter valve assembly is disposed below the mounting surface, thereby eliminating the need for an additional opening for the connection of a hose above the mounting surface. Further, the faucet assembly of this invention provides a single vertical conduit for the flow of mixed water, thereby substantially reducing the number of required connections These and other features of the present invention can be best understood from the following specification and drawings, the following of which is a brief description.

DETAILED DESCRIPTION OF THE PREFERRED EMBODIMENT

Figure 1:
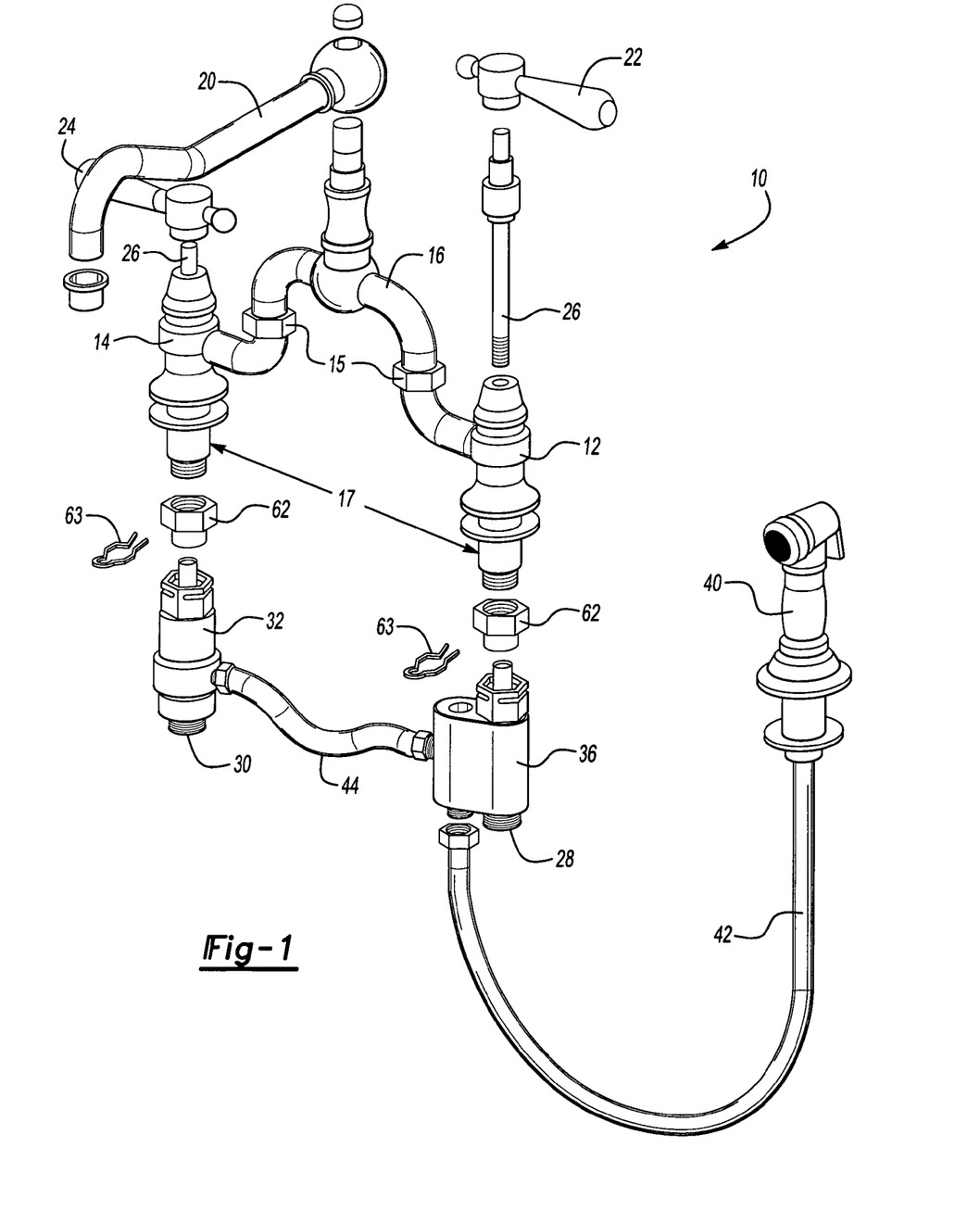
FIG. 1 is a partial exploded view of an example bridge faucet according to this invention.

Referring to FIG. 1, a faucet assembly 10 includes a cold-water pillar 12 and a hot-water pillar 14. A bridge 16 across the cold-water pillar 12 and the hot-water pillar 14 includes a spout 20 for dispensing water. The bridge 16 includes swivel connections 15 that allow for the adjustment of a distance 17 between the hot and cold-water pillars 12, 14. The hot and cold-water pillars 12, 14 extend through openings in a mounting surface 21 (FIG. 2) and connect to a water supply. Adjustment of the distance 17 between the hot and cold-water pillars provides for adaptation of the faucet assembly 10 to various mounting surfaces with different distances between openings.

The cold water pillar 12 includes a first handle 22 and the hot-water pillar includes a second handle 24. The first handle 22 and the second handle 24 are attached to corresponding stem extensions 26. The stem extensions 26 engage a valve cartridge 34 for controlling the flow of water through inlets 28, 30.

The cold-water pillar 12 includes a diverter valve assembly 36. The diverter valve assembly 36 houses the valve cartridge 34 for proportionally controlling water flow into the inlet 28. The hot-water pillar 14 includes a control valve assembly 32 that houses the valve cartridge 34 for proportionally controlling water flow from the inlet 30. A flexible connector hose 44 communicates water from the control valve assembly 32 to the diverter valve assembly 36.

A hand spray 40 is in fluid communication with the diverter assembly 36 through a flexible hose 42. The diverter assembly 36 includes an outlet 41 to which the flexible hose 42 is attached to communicate water to the hand spray 40. Water normally flows upward through the cold-water pillar 12 into the bridge 16 and out the spout 20. Actuation of the hand spray 40 causes a diverter valve 38 to actuate and divert water flow to the hand spray 40. The diverter valve 38 shuts off flow of water to the spout and allows only water flow to the hand spray 40.

Figure 2:
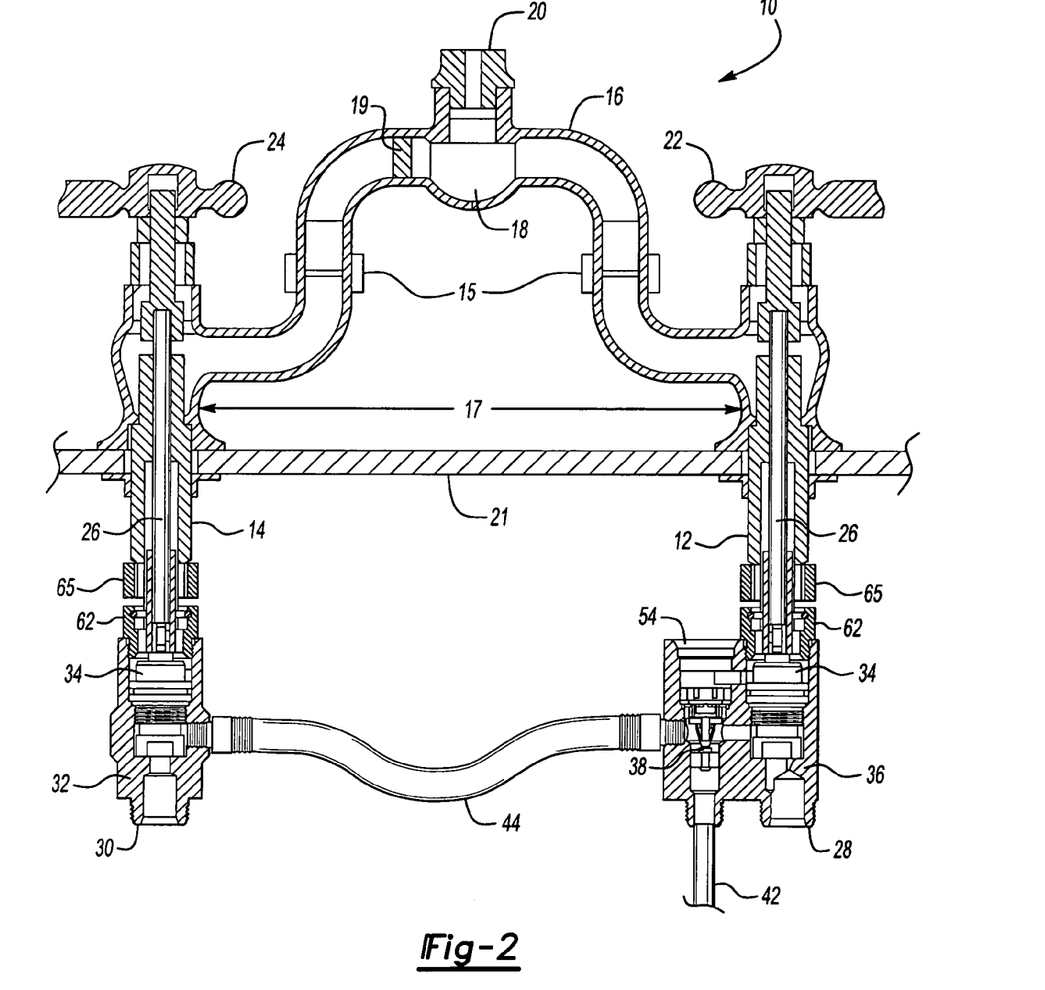
FIG. 2 is a cross-sectional view of an example bridge faucet assembly according to this invention.

Referring to FIG. 2, the diverter valve assembly 36 includes a first bore 46 and a second bore 48. The first bore 46 receives the valve cartridge 34 that is actuated by the stem extension 26. The valve cartridge 34 provides for the proportional control of fluid flow through the inlet 28. A worker skilled in the art with the benefit of this disclosure would understand that any known valve may be utilized for proportionally controlling fluid flow from a cold and hot-water source.

The second bore 48 of the diverter valve assembly 36 receives the diverter valve 38. The diverter valve 38 operates to close off flow of fluid to the spout 20 in response to flow through the hand spray 40. A plug 54 seals off a top opening of the second bore 48. The hose 42 is in fluid communication with the outlet 41 defined by the second bore 48. The diverter valve 38 can be of any configuration known to a worker skilled in the art.

The control valve assembly 32 is mounted to the hot-water pillar 14 and also includes the valve cartridge 34. The valve cartridge 34 provides for proportional control of hot-water entering the inlet 30. Hot-water entering the inlet 30 is proportionally controlled to flow into the connector hose 44. Flow through the connector hose 44 proceeds to the diverter valve assembly 36. Hot-water does not flow upwardly through the hot-water pillar 14. Instead, hot-water is directed to the diverter valve assembly 36 to mix with cold water and flow upward through the cold-water pillar. 12.

The bridge 16 defines the chamber 18 that receives water communicated upwardly through the cold-water pillar 12. Water from the cold water pillar 12 is already mixed with hot-water. Mixing of the different temperature water occurs in the diverter valve assembly 36 disposed below the mounting surface 21. The chamber 18 includes a plug 19 that prevents water from migrating into the hot-water pillar 14. The plug 19 also seals off portions of the chamber 18 such that the accumulation of stagnate water is substantially prevented.

During operation, hot-water flows through the inlet 30 and through the connector hose 44 as proportionally controlled by the valve cartridge 34. Cold water enters through the inlet 28 and is proportionally controlled by the valve cartridge 34. Water from both the hot-water inlet 30 and the cold-water inlet 28 are communicated to the second bore 48 of the diverter valve assembly 36. In the second bore 48 water is mixed and normally flows upwardly through the cold water pillar 12, into the chamber 18 and out the spout 20. In response to actuation of the hand spray 40, the diverter valve 38 closes off flow through the cold-water pillar 12 and directs flow through the flexible hose 42. Accordingly, water is mixed and directed from below the mounting surface with a single diverter valve 38.

Figure 3:
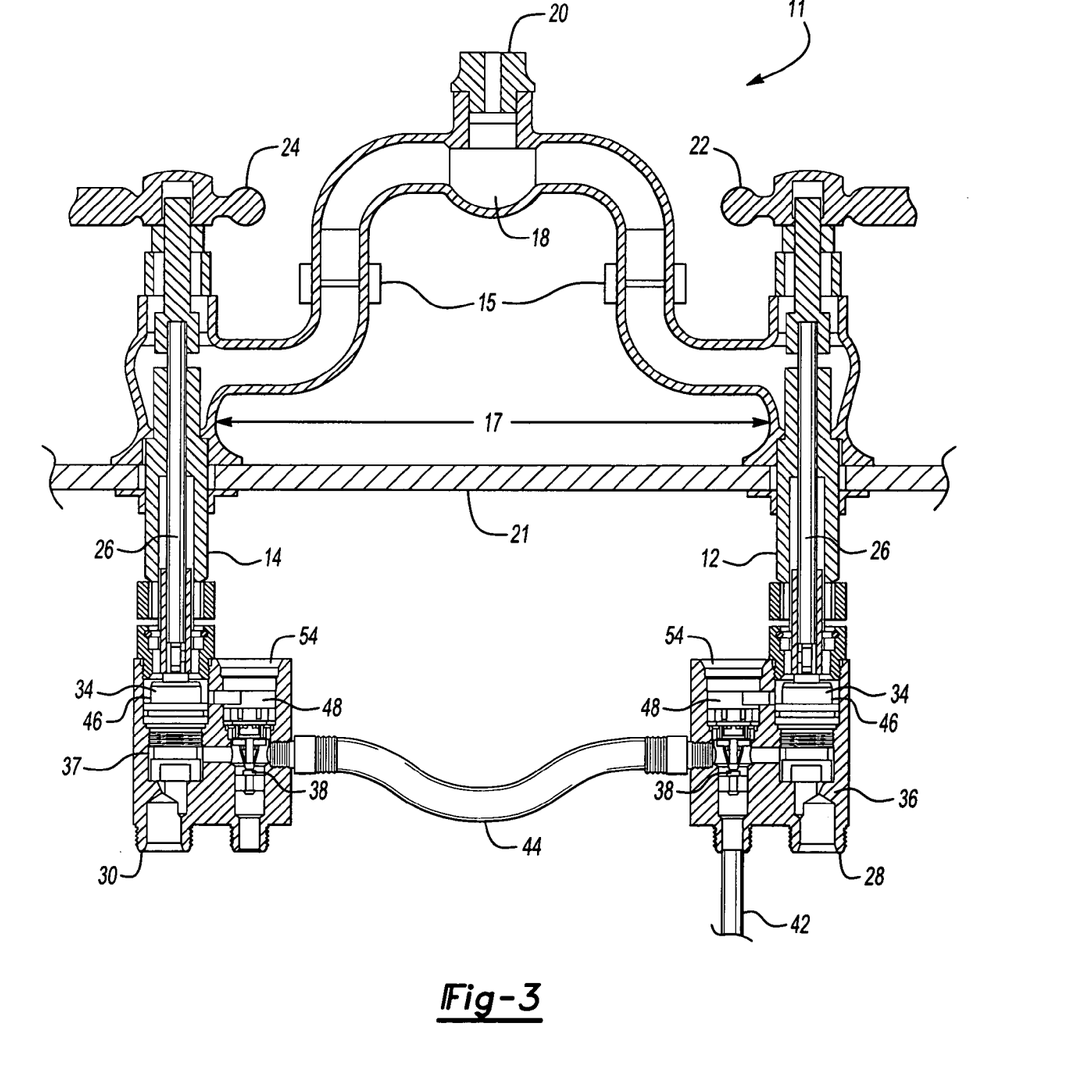
FIG. 3 is a cross-sectional view of another example bridge faucet assembly according to this invention.

Referring to FIG. 3, another faucet assembly 11 according to this invention includes a second diverter valve assembly 37. In this example faucet assembly 11, water is mixed both in the mixing chamber 18 and in the second bore 48 of the diverter valve assembly 36. The second diverter valve assembly 37 includes a valve cartridge 34 and a diverter valve 38. In operation, the diverter valves 38 are in a closed position that provide for the flow of water upward through each of the hot and cold water pillars 12, 14. Hot-water entering the inlet 30 flows upwardly through the hot-water pillar 14 and into the mixing chamber 18. Cold water entering the cold-water inlet 28 flows upwardly through the cold-water pillar 12. Water fills the second bores 48 of each diverter assembly 36 but is not flowing out the hand spray 40.

Actuation of the hand spray 40 begins water flow out through the hand spray 40 causing actuation of the diverter valves 38. Actuation of the diverter valves 38 stops flow through both the hot and cold water pillars 12, 14 and directs all flow through the second bores 48 and out the flexible hose 42. Accordingly, the faucet assembly 11 directs the flow and mixing of fluid both within the chamber 18 and within the second bores 38 of the diverter valve assemblies 36, 37.

Figure 4:
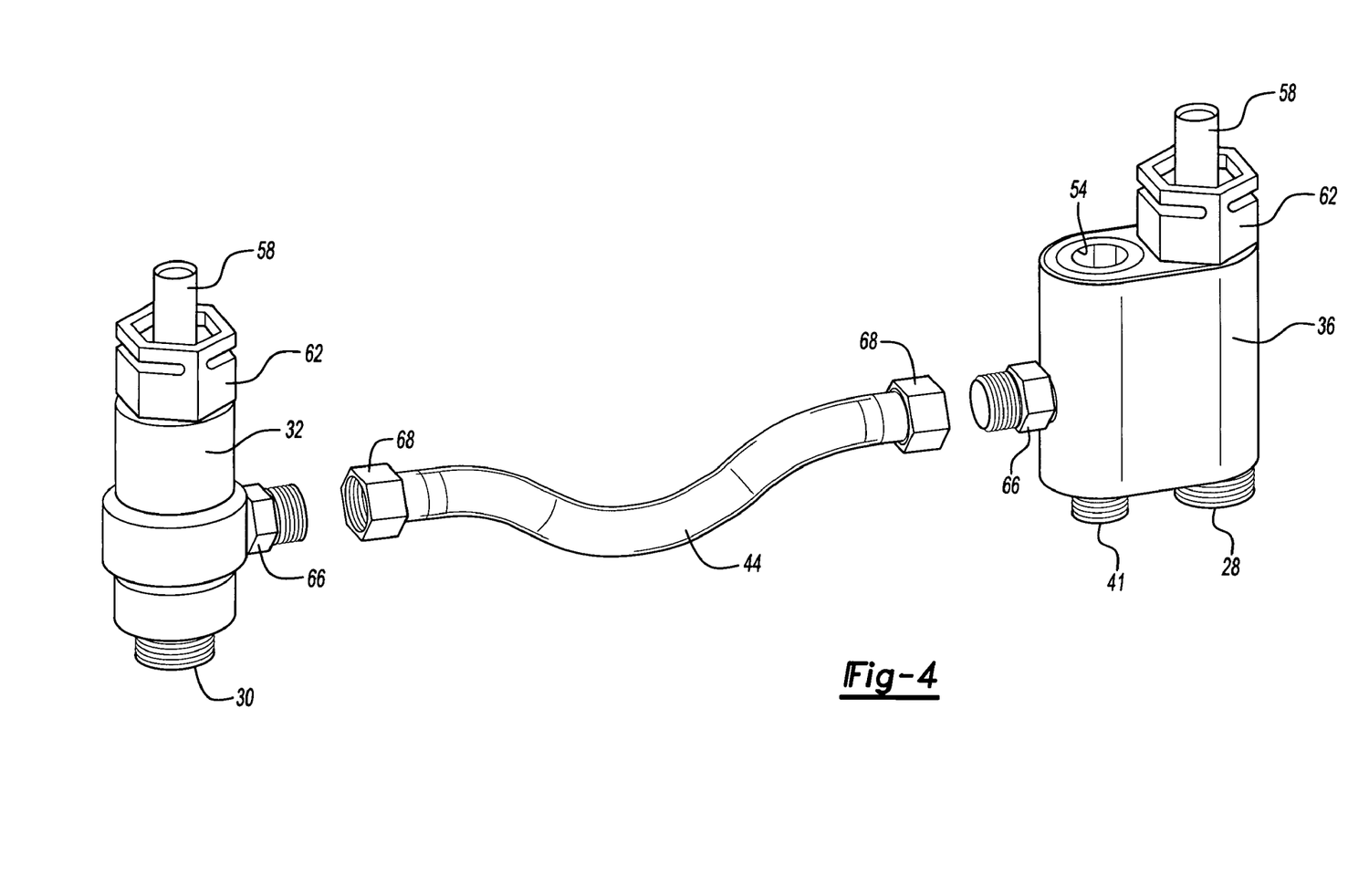
FIG. 4 is a perspective view of a fluid conduit between an example control valve assembly and diverter valve assembly.

Referring to FIG. 4, the diverter valve assembly 36 is shown with the control valve assembly 32. The control valve assembly 32 and the diverter valve assembly 36 are placed in fluid communication by the flexible connector hose 44. The flexible hose 44 allows the variation in spacing between the hot and cold-water pillars. 12, 14. The faucet assembly 10 includes the swivel connections 15 that provide for adaptation to mounting surfaces or applications with different spacing between openings for the hot and cold pillars 12, 14. Accordingly, the flexible hose 44 provides for the adaptation of the diverter valve assembly 36 as an add on feature to existing faucets, and also provides for the adaptation to various faucet assembly configurations.

Figures 5, 6:
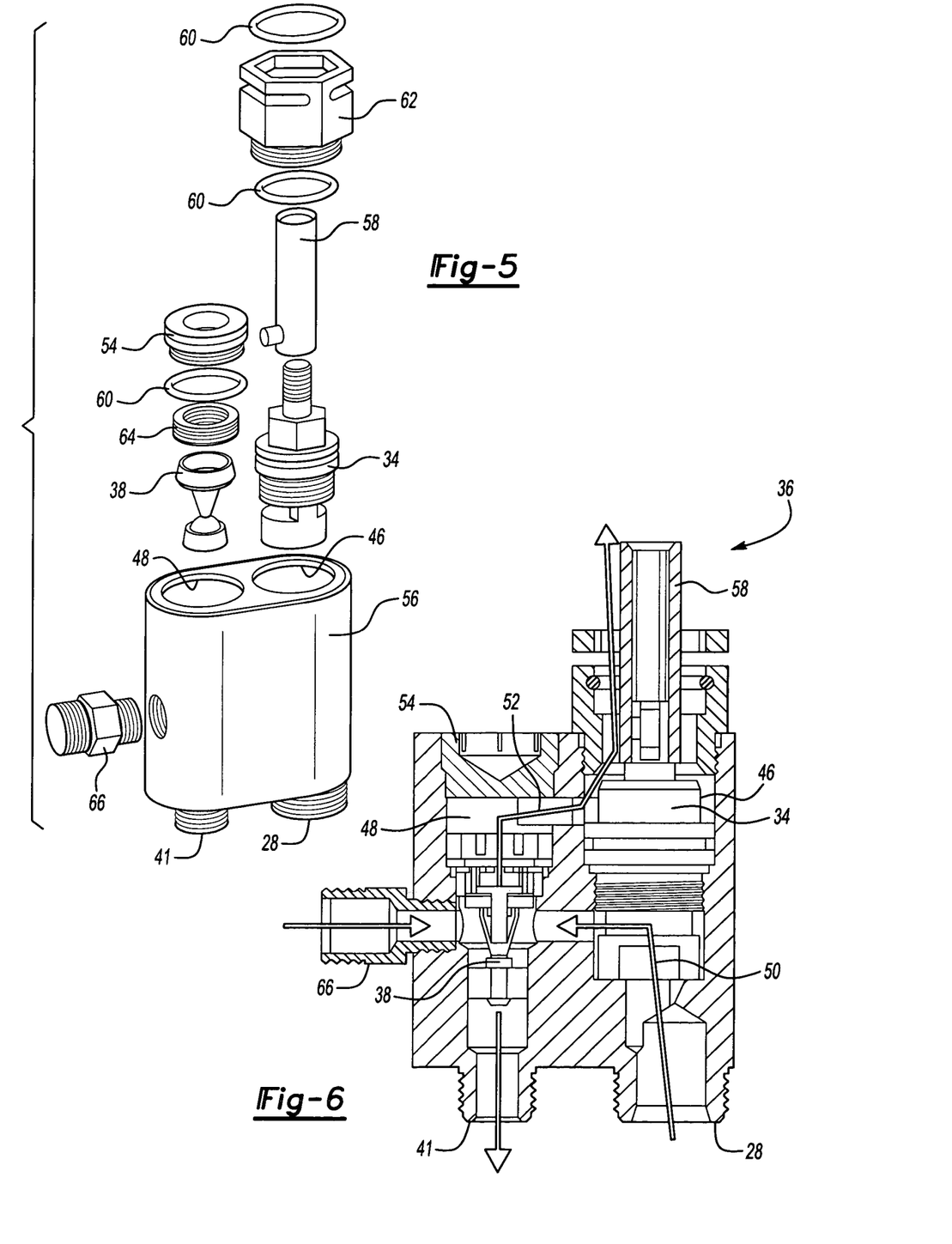
FIG. 5 is an exploded view of the diverter assembly.
FIG. 6 is a cross-sectional view of the diverter assembly.

Referring to FIG. 5, the diverter valve assembly 36 includes a housing 56 that defines the first bore 46 that receives the valve cartridge 34. The second bore 48 receives the diverter valve 38. The valve cartridge 34 includes a stem 58 that is engaged by the stem extension 26 that is operated from above the mounting surface. The valve cartridge 34 is threaded into the first bore 46. An adapter 62 is also threaded into the first bore 46. Seals 60 are disposed between the adapter 62 and the housing 56. Another portion of the adapter 65 is threaded onto the water pillar. The adapter 62 and 65 engage each other. A seal 60 is disposed between the adapters 62 and 65 to provide a water tight seal. The adapters 62 and 65 are held together by a clip 63. As appreciated, the adapters 62, and 65 are only one method of attaching the diverter valve assembly 36 to the water pillar, and other known methods are within the contemplation of this invention.

The diverter valve 38 is mounted within the second bore 48 and held in place by a retainer ring 64. A plug 54 is provided to seal off the second bore 48. A seal 60 is disposed between the plug 54 and the housing 56 to provide a fluid tight seal. A hydraulic fitting 66 is provided for communicating with the second bore 48. The second bore 48 defines the outlet 41 to the hand spray 42.

Referring to FIG. 6, cold water flowing from the inlet 28 is indicated by arrow 50 and flows into the second bore 48 responsive to proportional opening of the valve cartridge 34. The diverter valve 38 is normally open to allow flow from the first bore 46 to the second bore 48 and up through the cold water pillar 12. Hot-water enters the second bore 48 through the fitting 66, mixes with the cold water in the second bore 48 and flows through the cold water pillar 12 into the chamber 18 and out the spout 20. Water does not flow vertically through the hot-water pillar 14. As appreciated, although the configuration described and discussed in the illustrated example embodiment utilizes the cold-water pillar 12 as the only vertical flow conduit, the hot-water pillar 14 may also be utilized as the sole vertical flow conduit. The diverter valve assembly 36 may be attached to the hot-water pillar 14 and the control valve assembly 32 may be attached to the cold-water pillar 12.

Upon opening of the hand spray 40, water begins flowing through the hose 42. The water flow causes an imbalanced force on the diverter valve 38, causing the diverter valve 38 to close flow to the cold-water pillar 12. As appreciated, operation and configuration of the diverter valve 38 is as known. It is within the contemplation of this invention to utilize any known diverter valve for directing water to the hand spray 40.

Figures 7, 8:
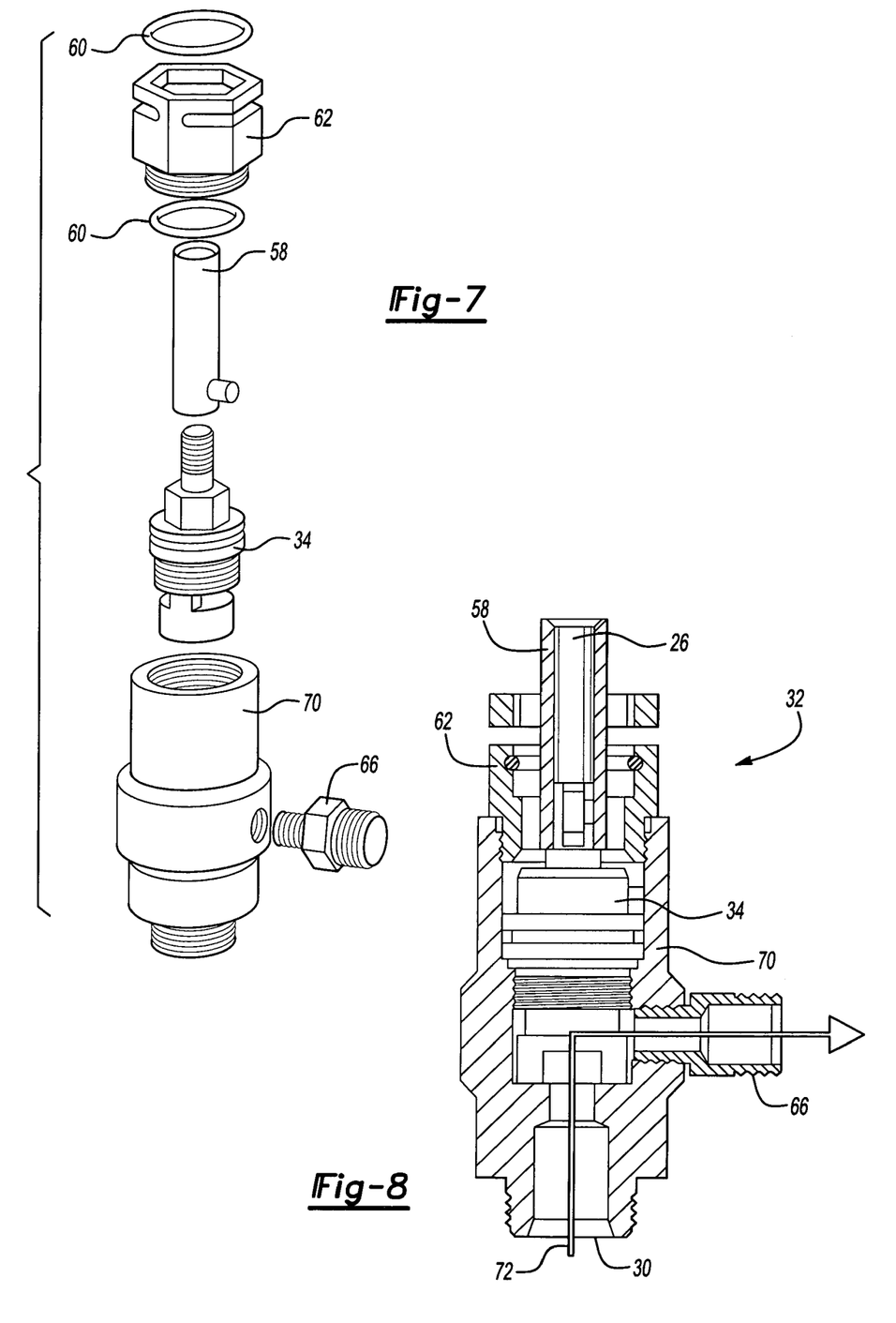
FIG. 7 is an exploded view of the control valve assembly.
FIG. 8 is a cross-sectional view of the control valve assembly.

Referring to FIGS. 7 and 8, the control valve assembly 32 that is disposed on the hot-water pillar 14 provides a housing 70 that defines a bore for receiving the valve cartridge 34. The valve cartridge 34 is of a common configuration to the valve cartridge within the diverter valve assembly 36. However, it is within the contemplation of this invention to utilize any valve configuration known a worker versed in the art for proportionally controlling the flow fluid from the inlet 30 out the outlet to the diverter valve assembly 36.

Accordingly, the example faucet assembly 10 provides for the use of a hand spray 40 with a bridge type faucet. The diverter valve assembly 36 is disposed below the mounting surface, thereby eliminating the need for an additional opening or for the connection of hose above the mounting surface. Further, the faucet assembly of this invention provides a single horizontal conduit between the hot-water pillar 14 and the cold-water pillar 12 and a single vertical conduit for the flow of mixed water, thereby substantially reducing the number of required connections Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A bridge faucet assembly comprising:
    a first inlet pipe;
    a second inlet pipe;
    a bridge including a spout and defining a chamber supported by said first inlet pipe and said second inlet pipe and in fluid communication with said first inlet pipe;
    a diverter assembly disposed on said first inlet pipe, said diverter assembly including a first control valve and a diverter valve;
    a second control valve on said second inlet pipe; and
    a hand spray in communication with said diverter assembly, wherein said diverter valve closes off fluid flow to said spout in response to actuation of said hand spray.

2. The assembly as recited in claim 1, including a flexible hose communicating fluid between said second control valve and said diverter assembly.

3. The assembly as recited in claim 1, wherein only said first inlet pipe provides a vertical fluid conduit from said diverter assembly to said chamber.

4. The assembly as recited in claim 3, wherein said chamber includes a plug preventing fluid from said chamber from flowing into aid second inlet pipe.

5. The assembly as recited in claim 1, wherein said diverter assembly comprises a housing defining a first bore and a second bore, said first control valve disposed within said first bore and said diverter valve disposed within said second bore.

6. The assembly as recited in claim 5, wherein said hand spray is in communication with said second bore.

7. The assembly as recited in claim 1, wherein a distance between said first inlet pipe and said second inlet pipe is adjustable.

8. The assembly as recited in claim 7, including pivotal connections between said bridge and each of said first and second inlet pipes.

9. The assembly as recited in claim 1, wherein said bridge is spaced apart from a mounting surface.

10. The assembly as recited in claim 1, wherein each of said first and second inlets include a stem that extends downward below a mounting surface.

11. A diverter assembly for a mixing faucet comprising:
    a diverter valve housing defining a first bore and a second bore;
    a diverter valve received within said second bore;
    a first control valve received within said first bore for proportionally controlling fluid flow from a first water source;
    a second control valve for proportionally controlling fluid flow from a second water source and in fluid communication with said second bore; and
    a hand spray in fluid communication with said second bore, wherein fluid flows from said diverter assembly to said faucet through said second bore.

12. The assembly as recited in claim 11, wherein fluid from said first water source and said second water source mixes within said second bore.

13. The assembly as recited in claim 11, including a flexible fluid conduit between said second control valve and said diverter housing.

14. The assembly as recited in claim 11, wherein said diverter valve shuts off fluid flow through said first bore to the mixing faucet in response to actuation of said hand spray.

15. A diverter assembly for a mixing faucet comprising:
    a diverter valve housing defining a first bore an a second bore;
    a diverter valve received within said second bore;
    a first fluid control valve received within said first bore for proportionally controlling fluid flow from a first water source;
    a second control valve for proportionally controlling fluid flow from a second water source and in fluid communication with said second bore; and
    a hand spray in fluid communication with said second bore, wherein fluid flows to said mixing faucet through a single vertical fluid conduit.

16. The assembly as recited in claim 15, wherein said single vertical conduit includes said first bore.

17. A diverter assembly for a mixing faucet comprising:
    a diverter valve housing defining a first bore and a second bore;
    a diverter valve within said second bore;
    a first fluid control valve, within the first bore for controlling fluid flow from a first fluid supply to the second bore;
    a passage from a second fluid supply to the first bore and then to the mixing faucet; and
    a hand spray in fluid communication with the second bore; wherein said second bore includes an opening for receiving fluid flow from the second fluid supply.

18. The assembly as recited in claim 17, wherein fluid flow from the second fluid supply is communicated to the mixing faucet through the passage independent of the first fluid control valve.

* * * * *

UNITED STATES PATENT AND TRADEMARK OFFICE
CERTIFICATE OF CORRECTION

PATENT NO.       : 7,216,663 B2
APPLICATION NO.  : 10/958914
DATED            : May 15, 2007
INVENTOR(S)      : Vinh Vu It is certified that error appears in the above-identified patent and that said Letters Patent is hereby corrected as shown below:

Claim 4, Column 5, line 61: "aid" should read as --said--

Claim 6, Column 6, line 36: "an" should read as --and--

Signed and Sealed this

Seventh Day of August, 2007

JON W. DUDAS
*Director of the United States Patent and Trademark Office*